Dec. 8, 1970  S. D. FISHMAN ET AL  3,545,100
SELECTOR MECHANISM

Filed June 26, 1968  7 Sheets-Sheet 1

INVENTOR
STANLEY D. FISHMAN
CHARLES W. LANHAM JR.
BY Greist, Lockwood, Greenawalt
& Dewey  ATT'YS.

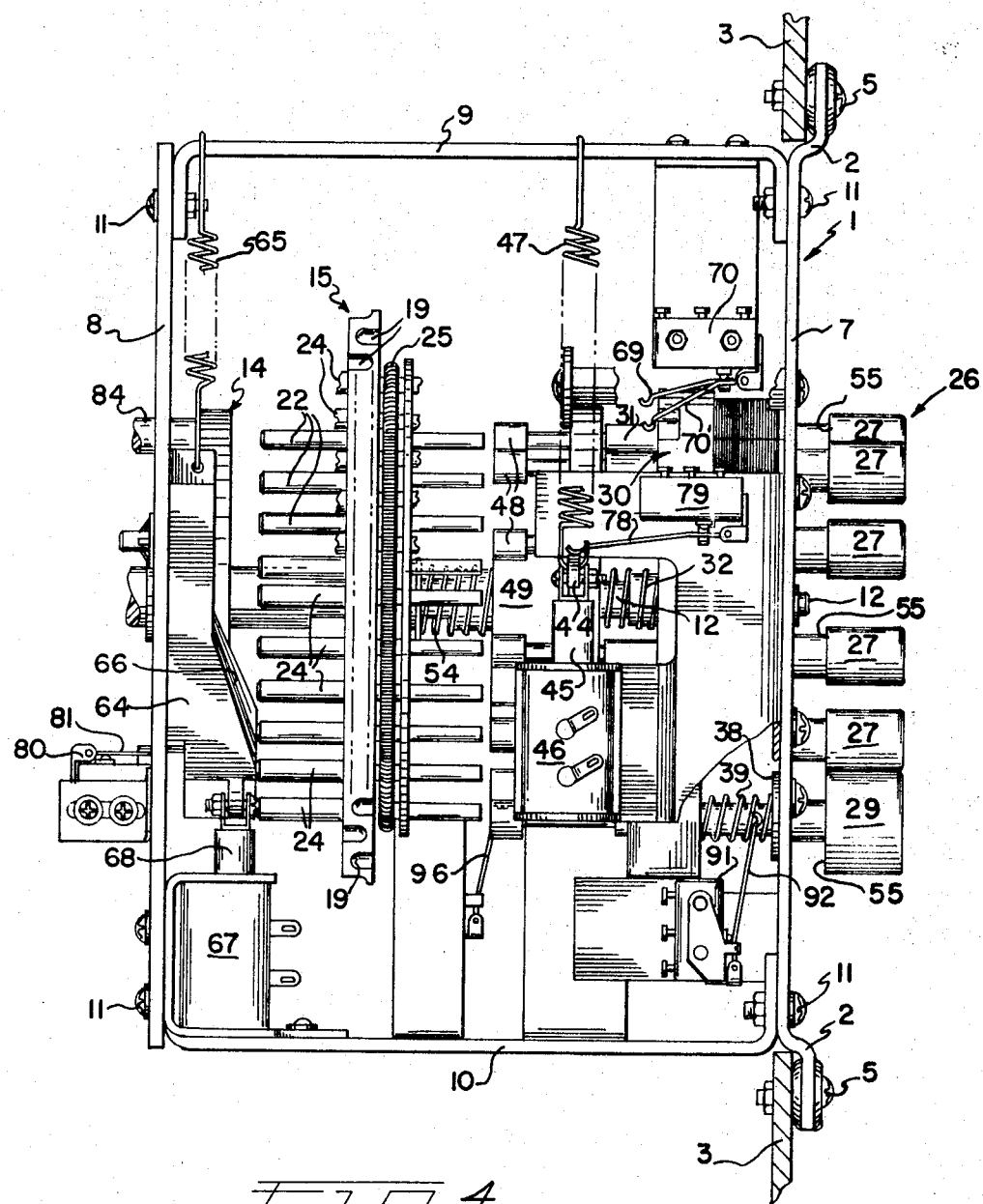

Dec. 8, 1970  S. D. FISHMAN ET AL  3,545,100
SELECTOR MECHANISM
Filed June 26, 1968  7 Sheets-Sheet 5
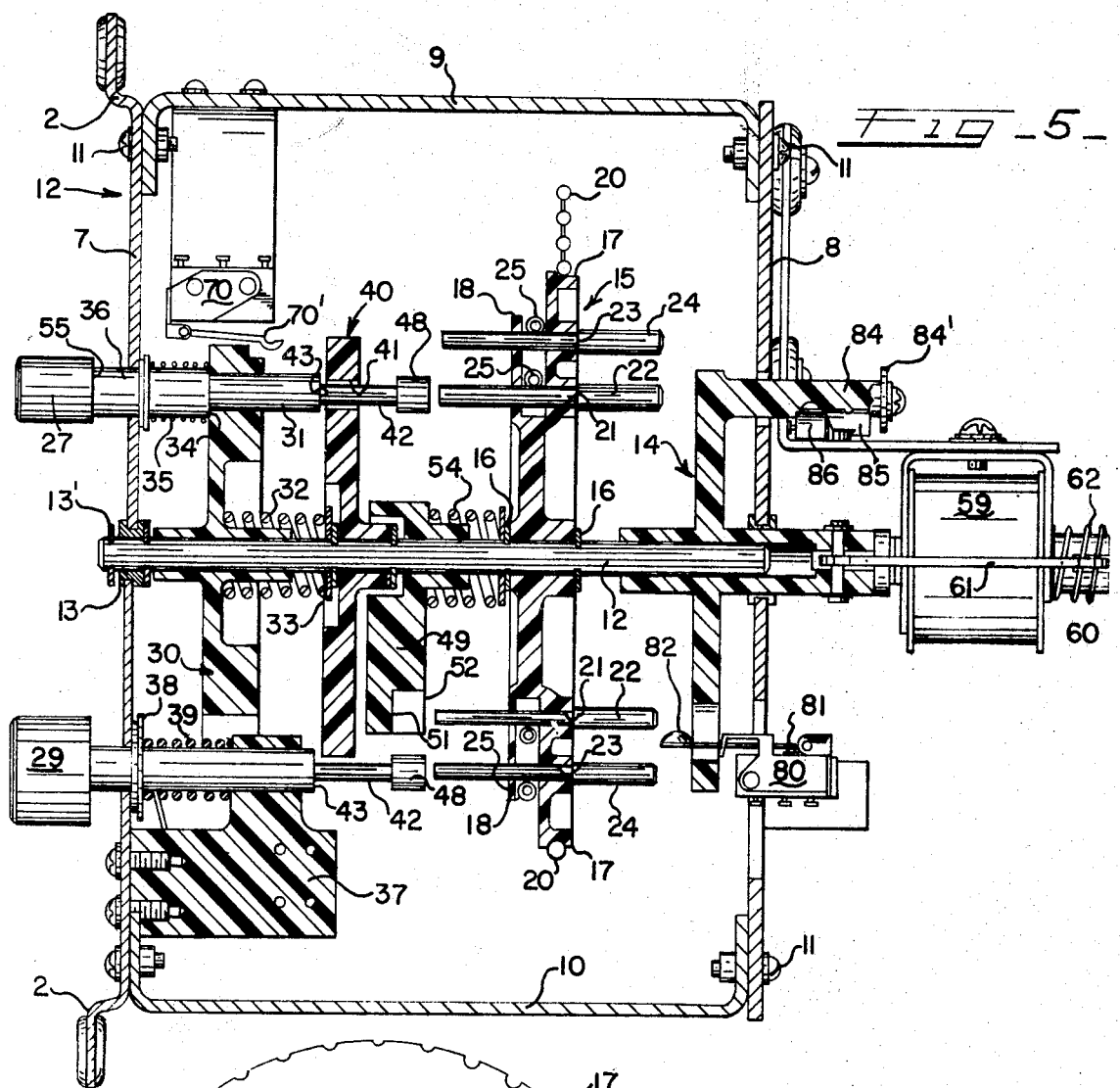
Fig-5-
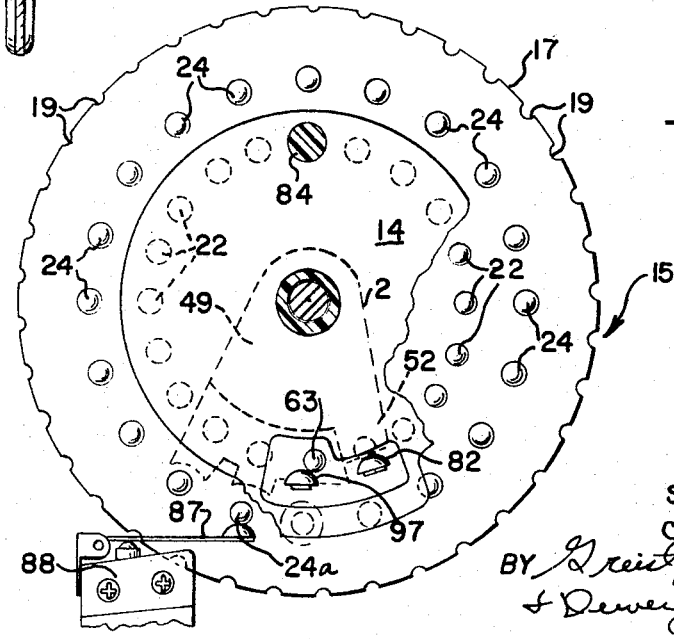
Fig-8-
INVENTOR
STANLEY D. FISHMAN
CHARLES W. LANHAM JR.
BY
ATT'YS.

Dec. 8, 1970  S. D. FISHMAN ET AL  3,545,100

SELECTOR MECHANISM

Filed June 26, 1968  7 Sheets-Sheet 6

INVENTOR
STANLEY D. FISHMAN
CHARLES W. LANHAM JR.
BY
ATT'YS.

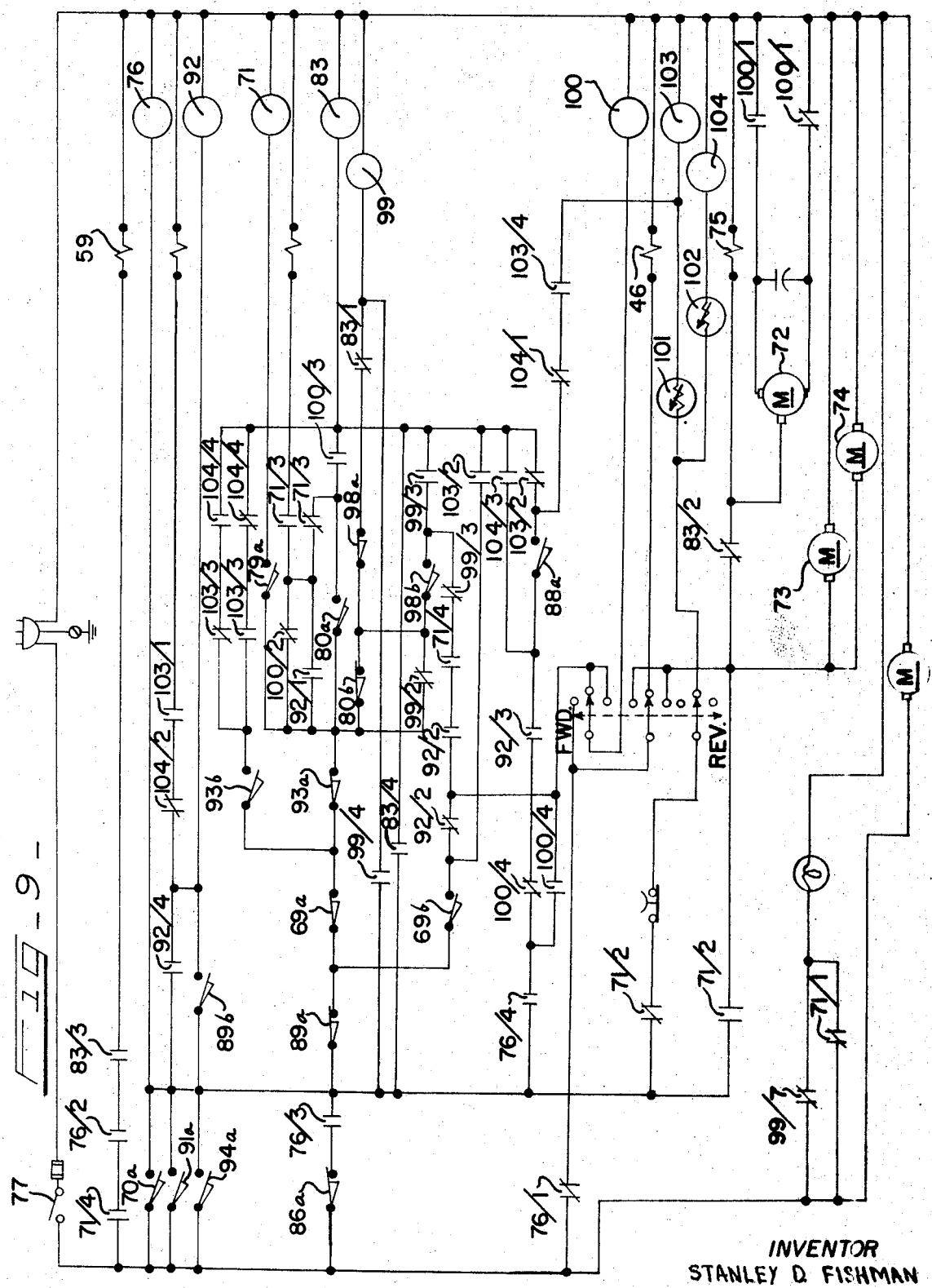

3,545,100
SELECTOR MECHANISM
Stanley D. Fishman and Charles W. Lanham, Jr., Silver Spring, Md., assignors to Sargent-Welch Scientific Company, Skokie, Ill., a corporation of Illinois
Filed June 26, 1968, Ser. No. 740,172
Int. Cl. G09b 3/00
U.S. Cl. 35—9                                    16 Claims

ABSTRACT OF THE DISCLOSURE

An electrically initiated and stopped selector mechanism for controlling the feeding of photographic film through a viewing machine. A lockout mechanism is provided to prevent further actuation of the selector mechanism while the selector mechanism is running in response to a previous selection. Logic circuitry which includes a sensing mechanism that is operable in response to code contained on the film is provided for controlling actuation of the lockout mechanism and for limiting the number of selections which are available at any film frame location.

BACKGROUND AND DESCRIPTION OF INVENTION

The present invention relates to a selector mechanism for controlling the movement of a driven member, for example, a film sprocket. More particularly, this invention concerns an improved selector mechanism for controlling the feeding of photographic film through a viewing machine such as the kind used for educational purposes where the successive frames of the film contain an orderly presentation of a course of study. The selector mechanism is operably connected to a drive for the film and provides the student with a selection as to the feeding of the film through the machine.

In teaching machines employing photographic film containing the subject matter of a course of study, it is the present practice to provide segments of the subject matter on different frames of the film with the successive frames containing more advanced segments of the course. In use, the selector mechanism controlling movement of the film through the machine is actuated by the student to cause a predetermined frame of the film to be fed to a viewing station. This frame contains a portion of the text being studied and is read by the student to give him certain information bearing on the course. At the end of the text contained on this frame, a question based on the text is included along with a series of multiple choice answers. Each of the separate answers is designated by a number or letter corresponding to a like number or letter on a series of pushbuttons on the selector mechanism. The pushbuttons are connected into the selector mechanism in such a way whereby depression thereof by the student causes a feeding of the film in accordance with the answer he has chosen to present the selected frame at the viewing station. If the answer chosen is correct, the actuation of the pushbutton corresponding to this answer will advance the film to a more advanced section of the course being studied where another portion of the text, a related question and series of multiple choice answers are presented. The student then reads the text now shown on the frame at the viewing station which now becomes the reference frame, answers the question and pushes the appropriate pushbutton of the selector mechanism and in this fashion continues through the course.

If in progressing through the course, the student makes an incorrect answer to the question presented on any particular reference frame of the film, depression of the corresponding pushbutton of the selector mechanism will, instead of advancing the film to the next more advanced section of the text, move the film to a selected frame where the material presented at the viewing station will inform the student of his incorrect answer. In addition, this new frame may contain a new question and series of possible answers or may instead contain specific instructions as to which pushbutton the student is to actuate. For example, the instructions may direct the student to depress a designated "return" pushbutton for returning the film to the frame containing the question he has just answered incorrectly for selecttion of another answer.

The instructions as to which pushbutton of the selector mechanism is to be actuated upon choosing of an incorrect answer depends on the incorrectness of the answer. If the incorrect answer chosen is one that indicates that the student needs to study other phases of the course before progressing any further, he will be instructed to actuate a "reverse" pushbutton which instead of merely returning the film to the question previously answered incorrectly will move the film to a more elementary section of the course from which the student will again progress through the course.

Selector mechanisms as presently used in such teaching machines for moving the film through the viewing station of the machine contain certain limitations permitting actuation by the student in such a manner whereby an orderly progression through the course may be lost. For example, it is possible with presently constructed selector mechanisms to actuate more than one pushbutton at a time and in this way upset the proper functioning of the selector mechanism. Not only can more than one pushbutton be actuated at the same time, it is possible after the depression of a single pushbutton to actuate another pushbutton while the selector mechanism is actually running and advancing the film in response to the first choice. Again, this can upset the proper functioning of the mechanism and cause it to lose control over the orderly progression through the course.

Another limitation of presently constructed selector mechanisms invloves the unrestricted selection that can be made by the student. Such selector mechanisms usually include a number of "forward" pushbuttons operable to effect only a forward movement of the film, a separate "return" pushbutton operable to return the film to the frame just previously located at the viewing station, and other pushbuttons, such as a "reverse" pushbutton, which will opearte to effect only a predetermined type of feeding of the film. As presently constructed, however, it is possible to push any one of these pushbuttons even though the frame being viewed may contain specific instructions as to which pushbutton should be actuated. Because of this, depression of the wrong pushbutton, either purposely or by mistake, may upset the proper progression through the subject matter as contained on the individual frames of the film.

In accordance with the teachings of the present invention, an improved selector mechanism for teaching machines employing photographic film is provided. The selector mechanism of the present invention is constructed so that actuation if its drive controlling movement of the film transport mechanism of the machine is electrically initiated and stopped rather than mechanically thus simplifying its construction and increasing its reliability. Further aspects of the present invention include a lockout mechanism which is operable to prevent actuation of a pushbutton while the selector mechanism is running in response to a previous selection; and logic circuitry controlling both the actuation of the lockout mechanism and also limiting the choice of pushbuttons which will operate at any particular time to effect a feeding of the film. This logic circuitry includes a sensing mechanism and is operable in response to code contained on the film. The control produced by the logic circuitry assures that the student progresses through the course in an orderly fashion.

The various features and advantages of the present invention will be more fully understood by reading the following detailed description of the presently preferred embodiment of the invention with reference being made to the accompanying drawings of which:

FIG. 4 is a view of the other side of the selector mechanism shown in FIG. 1 with certain parts broken away for clarity;

FIG. 5 is a cross-sectional view taken along line 5—5 of FIG. 1 with certain parts removed for clarity;

FIG. 8 is a cross-sectional view taken along line 8—8 of FIG. 2; and

FIG. 9 is a schematic of the electrical circuitry of the selector mechanism.

Figure 1:
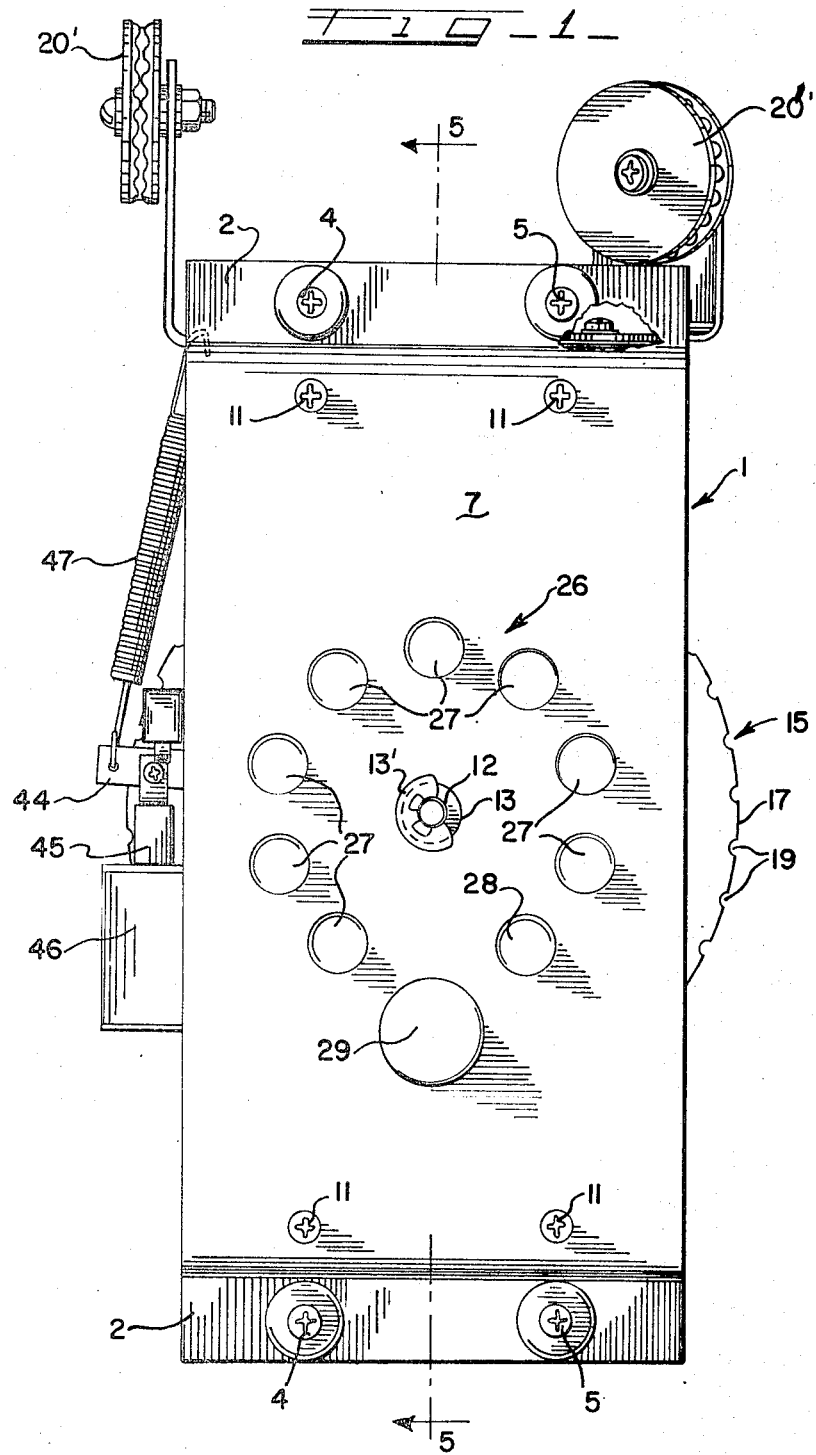
FIG. 1 is a front view of the selector mechanism constructed in accordance with the teachings of the present invention.
Figure 2:
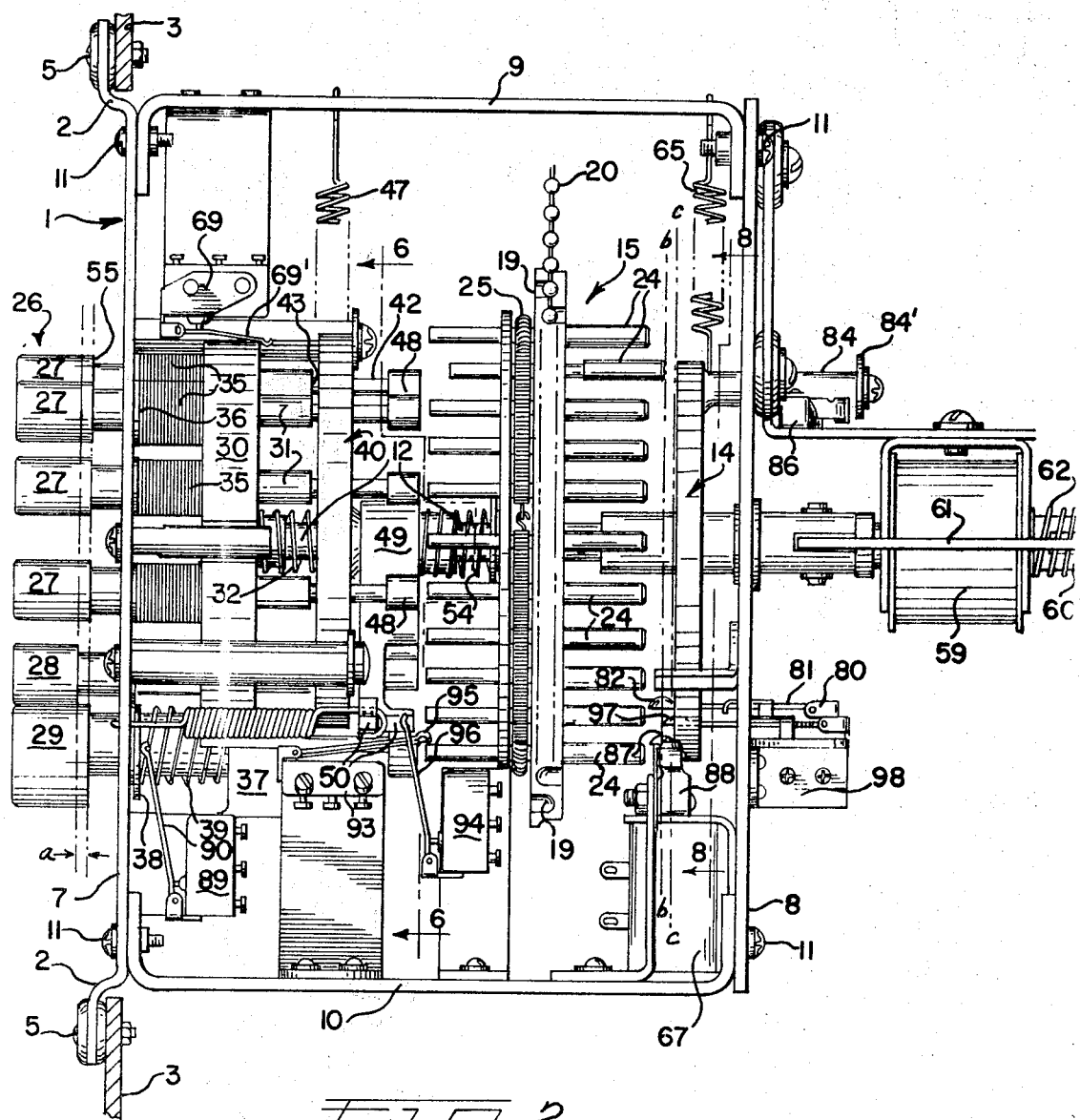
FIG. 2 is a view of one side of the selector mechanism shown in FIG. 1 with certain parts broken away for clarity.

As shown in FIGS. 1 and 2, the selector mechanism of the present invention includes a framework 1 having flanged supports 2 for connection to the framework 3 of the framework of the teaching machine. For this purpose, the flanged supports 2 are provided with holes 4 through which connecting bolts 5 are secured. As shown in FIG. 2, the framework of the selector mechanism includes a front plate 7 and a rear plate 8 connected at their ends to a top plate 9 and a bottom plate 10 by bolts 11. Extending across the interior of the framework 1 between the front plate and the rear plate is a support shaft 12. The front end of this shaft is rotatably secured to the front plate against axial movement by way of the bearing support 13 and snap ring 13' as shown in FIG. 5, while the rear end extends into a pin resetting plate 14 more fully described below.

A rotary pin carriage 15 is mounted on the support shaft 12 for rotation therewith. As shown in FIG. 5, in the illustrated embodiment the pin carriage is press fitted onto support shaft 12 and is located by a retaining ring 16. The pin carriage is made of suitable material such as plastic and formed at its periphery with spaced peripheral flanges 17, 18. The outer periphery of the flange 17 is provided with indentations 19 about which a bead-belt driving chain 20 is placed. This drive chain is connected through suitable pulleys 20' (FIG. 1) to the film drive or transport mechanism of the teaching machine for feeding the film through the machine in response to actuation of the selector mechanism; and in particular, in response to the rotary movement of the pin carriage.

The pin carriage is also provided with a plurality of holes extending therethrough in parallel relationship with respect to the support shaft 12. One array of these holes 21 is arranged in an inner circle for reception of index pins 22 while the other array of holes 23 is arranged in an outer circle for reception of memory pins 24. Each of the index and memory pins are mounted on the pin carriage for movement longitudinally of the axis of rotation of the carriage. For retaining the index and memory pins against accidental movement relative to the pin carriage, retaining springs 25 are wrapped about each array in frictional engagement therewith. In addition, the end of each of the pins which faces the rear plate 8 of the framework is enlarged thus limiting movement of these pins toward the front plate 7 of the framework. The end of each of the pins which faces the front plate 7 contains a retaining ring suitably located to limit movement of these pins toward the rear plate 8.

Cooperating with the pins on the pin carriage are a plurality of depressible selector pushbuttons generally designated at 26. These pushbuttons are mounted on the front plate of the framework for movement axially toward the cooperating pins to effect an extension of these pins; and in this way, each of the pushbuttons, upon depression by the student, sets the selector drive mechanism to produce a prescribed movement of the film transport in accordance with the particular index and memory pins which have been extended.

As shown in FIG. 1, there are ten pushbuttons. Eight of these pushbuttons designated 27 function as forward selector pushbuttons and are each disposed in axial alignment with the inner array of index pins. Another one of the pushbuttons defines a reverse selector pushbutton 28 also in axial alignment with the inner array of index pins. The tenth pushbutton 29 is, on the other hand, a return selector pushbutton axially aligned with the outer array of memory pins.

Each of the pushbuttons 27 are supported interiorly of the selector mechanism by a switch actuating plate 30, movement of which is controlled by these pushbuttons. For this purpose, these pins at an intermediate position along their length are provided with a section 31 of reduced diameter. A compression spring 32 mounted about the support shaft 12 is positioned between the plate 30 and a collar support 33 fixed to the shaft 12 inwardly of the plate 30. This compression spring 32 urges the plate 30 to the left as viewed in FIG. 5 and into engagement with the lands 34 formed on the pins by the reduced section 31. With this construction, depression of any of the pushbuttons 27 will cause axial movement of the plate 30 away from the front plate; and when a depressed pushbutton is released, the spring 32 will cause it, together with the plate, to return to its original position. Movement of the switch actuating plate in this manner controls certain switches in the circuitry of the selector mechanism for controlling operation of the selector mechanism as more fully described below. In addition to the spring 32, a compression spring 35 surrounds each of the pushbuttons 27 between a washer 36 fixed to each of these pushbuttons and the facing surface of the switch actuating plate 30. Thus, upon depression of any one of the pushbuttons 27, the remaining ones will stay in their original unactuated position.

In contrast to the mounting of the pushbuttons 27, the return selector pushbutton 29 is mounted independently of the switch actuating plate 30; and as shown in FIG. 5, its intermediate section is slidably disposed within a bearing support member 37. This return selector pushbutton 29 has a support washer 38 fixed thereto inwardly of the front plate of the framework; and disposed between this washer and the facing surface of the bearing support member 37 is a compression spring 39. This spring, like the springs associated with the pushbuttons 27, normally urges the pushbutton 29 to its original position and thus automatically causes a return to that position after depression by the student. Since the return selector pushbutton is not supported by the switch actuating plate 30, depression thereof does not actuate the switches controlled by the plate 30. Instead, other switches are positioned for control by the movement of the return selector pushbutton as more fully described below.

Figure 6:
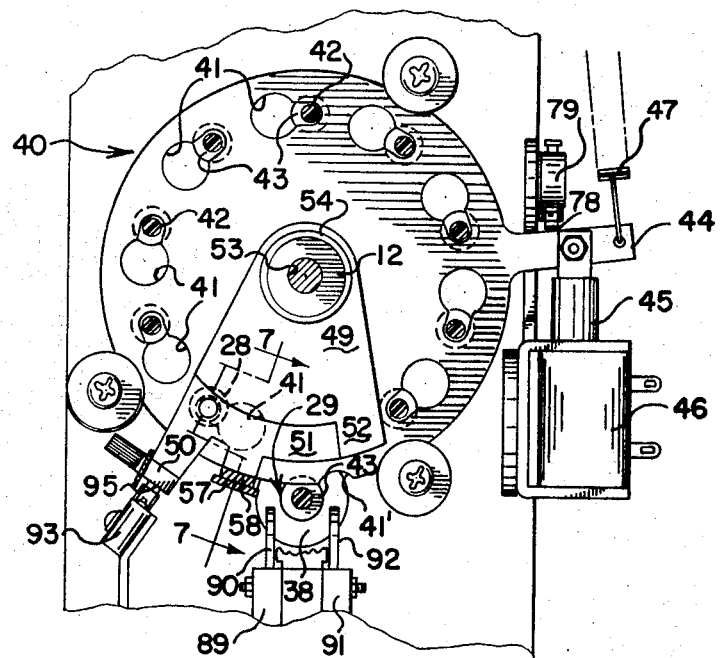
FIG. 6 is a cross-sectional view taken along line 6—6 of FIG. 2 with certain parts removed for clarity.
Figure 7:
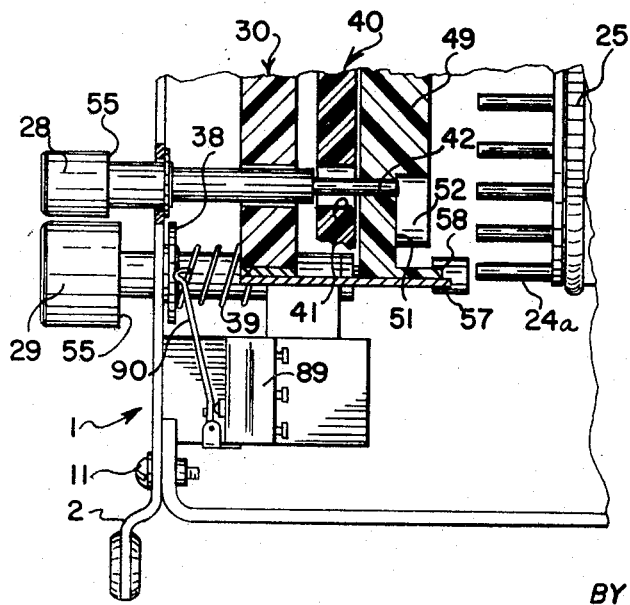
FIG. 7 is a cross-sectional view taken along line 7—7 of FIG. 6.

The construction and mounting of the reverse selector pushbutton 28 also differs from that of the pushbuttons 27. As shown in FIGS. 6 and 7, this pushbutton, although extending through the switch actuating plate 30 is not provided with any land 34 engaging the plate 30. Instead, the shank portion of this pushbutton is slidably received within the plate 30 for movement relative thereto so that upon being depressed, it will not cause any movement of the switch actuating plate 30 and will therefore not cause actuation of the switches otherwise controlled by the plate 30 to initiate a driving cycle of the selector mechanism. As will be described later, pushbutton 28 controls other switches causing a reverse movement of the pin carriage.

Although depression of the pushbutton is required to set the selector mechanism in operation, it is not desirable that the student be permitted to depress the pushbuttons at certain critical times which would cause an improper operation of the drive mechanism or damage to the parts. For preventing depression of the selector pushbutons during these critical times and in particular during a running operation of the selector mechanism (i.e. when the pin carriage is rotating), a lockout plate 40 is provided. This lockout plate is rotatably secured to the support shaft 12 in a fixed axial position and is provided with a plurality of key-shaped openings 41 through which the selector pushbuttons 27, 28 extend. As shown in FIG. 2, the shank portion of each of the selector pushbuttons has a section 42 of reduced diameter forming a land 43 facing the lockout plate. As shown in FIG. 6, the diameter of the land 43 of each of the pushbutons 27, 28 is such as to pass through the enlarged portion of the key slot opening whereas only the reduced section 42 may pass through the smaller portion of these openings. As also shown in FIG. 6, the periphery of the lockout plate is disposed in axial alignment with the land 43 of the return selector pushbutton 29 but is provided with an opening 41' similar in function to the openings 41.

In the lockout position of the plate 40 which is shown in FIG. 6, the land 43 of each of the pushbuttons 27, 28 is axially aligned with the smaller portion of the key slot openings and the land 43 of the return selector pushbutton 29 is aligned with the periphery of the plate. By rotating the plate in a clockwise direction from the position shown in FIG. 6, the enlarged portions of the openings 41 are brought into alignment with the lands 43 of the pushbuttons 27, 28 and the opening 41' is brought into alignment with the land 43 of the pushbutton 29. To effect rotation of the lockout plate, it is provided with an extending arm 44 which is, in turn, connected to the plunger 45 of a solenoid 46 by means of an intermediate link. A spring 47 also connected to this arm normally holds the lockout plate in the lockout position; and the solenoid is operable to pull the arm 44 in a downward direction against the action of the spring 47 thus moving the plate to a cleared position permitting depression of the pushbuttons.

Each of the selector pushbuttons 27 and 29 are provided at their forward end with enlarged heads 48 for engaging against the axially aligned pin when depressed. The forward end of the pushbutton 28 engages an enlarged head which in the illustrated embodiment is in the form of a plastic bar 49. As shown in FIGS. 2, 6 and 7, plastic bar 49 includes a switch actuating arm 50 operable upon depression of the pushbutton 28 to actuate cooperating switches causing reverse movement of the selector mechanism as more fully described below. In addition, plastic bar 49 actuated by pushbutton 28 is provided with a raised projection 52 in alignment with the inner array of index pins whereby depression of the pushbutton 28 will cause the plastic bar 49 to engage against the index pin aligned with the portion 52 only. The plastic bar 49 for the pushbutton 28 is stabilized by being mounted on the support shaft 12 which extends through a hole 53 in the plastic bar. Also, for urging the plastic bar 49 and the pushbutton 28 to its normal unactuated position, a spring 54 is provided. This spring as shown in FIGS. 2 and 5 is positioned about the support shaft 12 between the plastic bar and the facing surface of the snap ring associated with the pin carriage.

As indicated above, extension of the index and memory pins, as caused by depression of one of the selector pushbuttons, sets the selector mechanism for producing a prescribed movement of the film transport mechanism of the teaching machine. The particular operation performed depends on the pins extended and the amount of such extension. The amount of extension is, in turn, determined by the spacing of the exposed button portions of the pushbuttons from the front plate 7 of the framework 1. Each of these button portions includes a land 55 facing the front plate of the framework which upon engagement therewith prevents further depression of the pushbuttons. As will be seen from FIG. 2, the spacing of the land 55 of each forward selector pushbutton 27 and the return selector pushbutton 29 from the front plate 7 of the framework is equal while that of the reverse selector pushbutton 28 is greater. This difference in spacing is designated in FIG. 2 at *a*. With this construction, depression of any one of the pushbuttons 27 or 29 will cause the aligned pin to move to an extended position with its forward end disposed in the plane *b—b* (FIG. 2) whereas depression of the reverse pushbutton 28 will cause the aligned pin to move to an extended position in which its forward end is disposed in the plane *c—c*. From FIG. 2, it will be noted that the spacing between the plane *b—b* and the plane *c—c* is equal to the spacing *a*. As more fully described below, certain switches of the logic circuitry of the selector mechanism are disposed in the planes *b—b* and *c—c* for actuation by the extended pins, one of the reasons for this being to prevent improper movement of the film transport mechanism upon the depression of a forward selector pushbutton 27 and then a full depression of the reverse selector pushbutton 28. Such a selection, which would normally result in the extended index pin prematurely operating certain stop switch means located in the plane *c—c* and thereby allow an improper examination of frames not yet available by normal sequence instructions, is prevented since the extension of any of the pins aligned with the forward selector pushbuttons is never beyond the plane *b—b*.

In accordance with the teachings of the present invention, depression of either of the pushbuttons 27, 28 in addition to effecting an extension of an index pin causes an extension of a predetermined memory pin. As shown in FIGS. 6 and 7, the switch actuating plate 30, the movement of which is controlled by actuation of the forward pushbuttons 27, is provided with a memory selector arm 57 which is axially aligned with the outer array of memory pins at a fixed location about such array. Similarly, the plastic bar 49 of the reverse selector pushbutton 28 is provided with a memory selector arm 58 which is also axially aligned with the outer array of memory pins at the same fixed location. Accordingly, depression of either of the pushbuttons 27 or 28 will effect depression of the axially aligned index pin and the memory pin located in alignment with memory arms 57 and 58. The extension of the memory pin sets the selector mechanism so that it may be returned to its original or reference position after a selection has been made.

After the completion of each cycle of the selector mechanism as caused by actuation of one of the pushbuttons, it is necessary to clear the previously extended index pin from its extended position. To effect this result, the pin resetting plate 14, previously described in connection with the mounting of the support shaft 12, is moved to the left from the position shown in FIG. 5. The size of this plate is such as to engage against the extended index pin and return it to its original position. Movement of the pin resetting plate is controlled by the solenoid 59, the plunger 60 of which is connected to the pin resetting plate by means of the arm 61 and normally held in an extended position by means of the spring 62. In this position, the pin resetting plate will be located at a distance spaced from the aligned index pins. As shown in FIG. 8, the pin resetting plate is provided with a cutout portion 63 whereby actuation of the plate will not cause a resetting of the index pin axially aligned with this cutout.

For resetting the memory pins, a solenoid controlled cam 64 is provided. As shown in FIG. 4, this cam is normally urged to an upper position by means of a spring 65. In this position, the cam surface 66 is aligned with the outer array of memory pins and in the path of movement of any extended memory pin. Accordingly, rotation of the pin carriage causing movement of any extended memory pin past this cam surface will cause it to move back to its normal unextended position. A solenoid 67 has its plunger 68 connected to the other end of the cam 64 and upon actuation will cause the cam to move against the action of the spring 65 to a lowered position with the camming surface 66 out of alignment with the outer array of memory pins.

The above description completes the mechanical arrangement of the parts of the selector mechanism. The logic control circuitry of the mechanism and the relationship of the various parts thereof to the mechanical arrangement will now be described with particular reference being made to FIG. 9 of the drawings.

As previously stated, depression of any one of the forward selector pushbuttons 27 will cause axial movement of the switch actuating plate 30. Disposed in alignment with this plate is a switch means comprising two limit switches 69, 70. As shown in FIGS. 2 and 4, each of these switches have their actuating arm 69', 70' overlying the upper edge of the switch actuating plate 30 whereby movement of the plate toward the pin carriage will cause upward movement of these arms to depress the cooperating buttons of these switches. The positioning of the arm 69', 70' is such so that the switches 69 and 70 are operated in sequence with the switch 69 being first operated upon the commencement of the depression of the pushbutton 27 and the switch 70 being actuated near the completion of the depression of a pushbutton 27. As indicated in FIG. 9, the limit switch 69 has a normally closed contact 69a and a normally open contact 69b while switch 70 has a normally open contact 70a. Thus depression of any pushbutton 27 will first open contact 69a and close contact 69b and then close contact 70a; and upon release of the depressed bushbutton and its return to its normal position, the contact 70a will first open and then the contact 69a will close and the contact 69b will open.

The opening of contact 69a of switch 69 opens the portion of the circuitry leading to the run relay 71 of the system. Run relay 71 has a plurality of normally open and normally closed contacts 71/1, 71/2, 71/3 and 71/4 and controls running of the selector mechanism through the drive motor 72, take-up motor 73, 74 and the clutch solenoid 75 of the system. Thus, as long as any one of the pushbuttons 27 remains depressed, the selector mechanism will not effect a driving rotation of the pin carriage.

Upon closing of the contact 70a of switch 70, the circuit will be completed to the coil of another relay 76. This relay has a plurality of normally open and normally closed contacts 76/1–76/4; and when power to the electrical circuitry of the selector mechanism is turned on, as by a closing of the main switch 77, this relay 76, due to the presence of the normally closed contact 76/1, permits energization of the solenoid 46 connected to the arm of the lockout plate 40 to normally hold its plunger in a retracted position against the action of the spring 47 and thus normally holds this plate in a cleared position permitting initial depression of the pushbuttons 27. Once a pushbutton is depressed, however, the switch 70 is actuated to pull in relay 76 and open the contact 76/1 thus removing current to the solenoid 46. The spring 47 connected to the lockout plate will then urge the lockout plate to its lockout position; and therefore as soon as the depressed pushbutton is released and returned to its original position, the lockout plate will rotate to the lockout position shown in FIG. 6 preventing any further depression of the pushbuttons until the solenoid 46 is again energized.

As the arm 44 of the lockout plate is caused to move upwardly under the influence of the spring 47 as the depressed pushbutton is released, it engages the operating arm 78 of a limit switch 79 (FIG. 4). This limit switch has a normally open contact 79a which upon actuation by the arm 44 is closed. Return of the depressed pushbutton to its normal position also recloses contact 69a of switch 69 to direct current to the run relay 71 and thus start the drive motor 72 due to the closing of the normally open contact 71/2. Running of the drive motor 72 will cause the pin carriage of the selector mechanism to rotate in a forward direction. With reference to FIG. 8, forward rotation is a clockwise rotation.

As forward rotation of the pin carriage progresses, the index pin which has been moved to a normal extended position with its forward end disposed in the plane b—b will move through an angular distance until it makes contact with the second switch means comprising limit switch 80. As will be seen from FIGS. 2, 5 and 8, switch 80 has an actuating arm 81 terminating in a contact portion 82 disposed in axial alignment with the inner array of index pins and in the plane b—b. As the extended index pin engages the portion 82 of the actuating arm of switch 80, it will cause the arm to be cammed downwardly from the position shown in FIG. 5 and thus effect a depression of the button associated with the switch. Limit switch 80 has a normally open contact 80a and a normally closed contact 80b; and upon actuation, will close the circuit leading to the stop relay 83 of the circuit.

Relay 83 has a plurality of normally open and normally closed contacts 83/1–83/4; and energization of the coil of this relay will open the normally closed contact 83/2 to remove power to the motors and clutch drive components of the system. This, in turn, will cause the film transport to stop and with the selected frame of the film in a proper viewing position.

Figure 3:
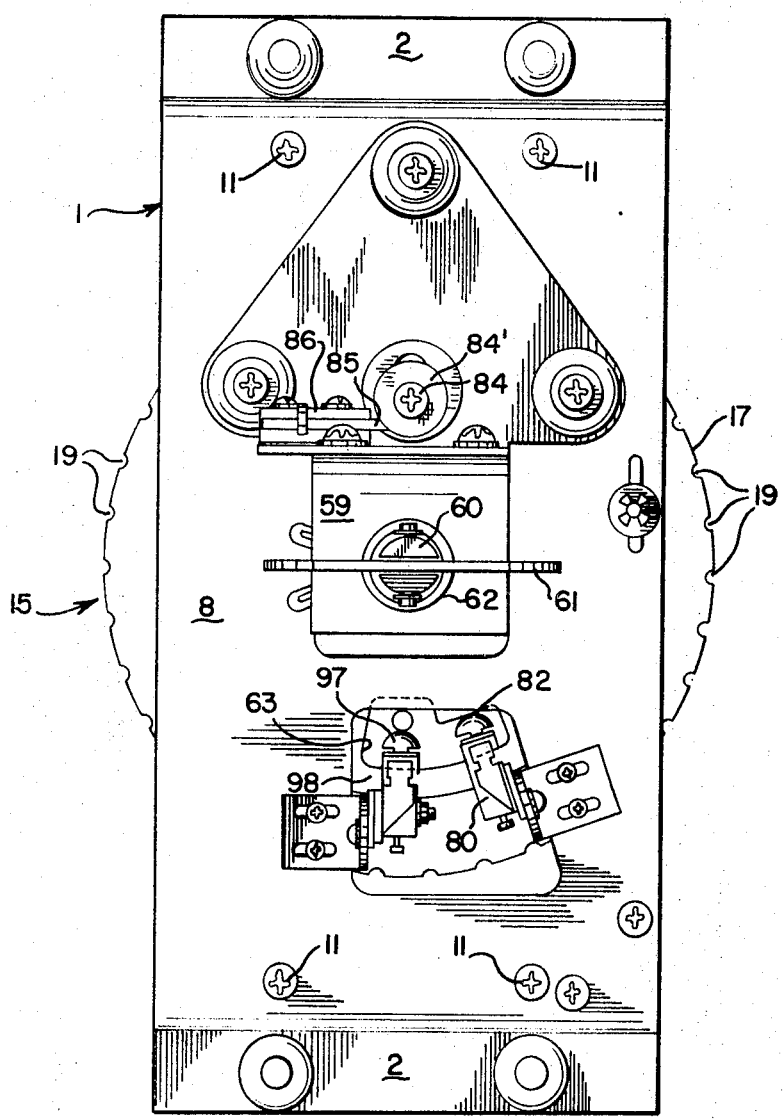
FIG. 3 is a rear view of the selector mechanism shown in FIG. 1.

As the coil of the relay 83 is energized, power is also directed to solenoid 59 controlling actuation of the pin resetting plate 14 (FIG. 2). Energization of solenoid 59 causes its plunger 60 to be pulled in against the action of the spring 62. This causes a movement of the pin resetting plate 14 toward the pin carriage and the previously extended index pin, now located in engagement with the contact portion 82 of switch 80 (FIG. 8), to move it back to its normal position thus preparing the selector mechanism for a new selection. As shown in FIGS. 2, 3 and 5, the pin resetting plate 14 has a pin actuating arm 84 with an enlarged head 84' aligned with the arm 85 of a limit switch 86. This limit switch includes a normally closed contact 86a which upon opening as caused by actuation of the pin resetting plate momentarily cuts off the power to the main power relay 76 and to run relay 71 thus causing the contacts of this relay to return to their normally open and closed positions.

To correlate the movement of the film transport to that of the pin carriage, the angular spacing of the pushbuttons 27 is constructed, for example, to correspond to two film frame widths. Also, the angular positioning of the selector pushbuttons 27 are related to the positioning of the limit switch 80 so that depression of any of the forward selector pushbuttons 27 will cause a different amount of rotary movement of the pin carriage and thus a different length of movement of the film. With reference to FIG. 1, the forward selector pushbutton 27 shown at the lower left of the figure is angularly spaced from the limit switch 80 by a distance corresponding to one frame width so that depression of this pushbutton will advance the film by a single frame width. Following around in clockwise direction in FIG. 1, each successive pushbutton 27 is angularly spaced from the next preceding pushbutton by a distance corresponding to two frame widths. Thus, it will be evident that depression of the forward selector pushbutton 27 immediately adjacent the reverse selector pushbutton 28 will cause a film movement of fifteen frame widths.

As indicated above, depression of a forward selector pushbutton 27 is operable to advance the film in response to a chosen answer to a question presented on the frame of the film being viewed when the pushbutton is depressed. If a correct answer has been chosen, the next frame presented at the viewing station after the selector mechanism has cycled as described above will merely present a new section of the text, a new question and a new series of possible answers. If, however, an incorrect answer has been chosen, the frame to which the film is moved may either instruct the student to depress the return pushbutton 29 or the reverse pushbutton 28 depending on the incorrectness of his answer. If the instructions are for the student to depress the return pushbutton so as to return him to the frame showing the question he has just answered incorrectly, the pin carriage must be rotated back to the position from which it has just moved. For example, if the answer the student chose required the depression of a pushbutton 27 which advanced the film in a forward direction by nine frames, depression of the return pushbutton must rotate the carriage in a reverse direction by an amount corresponding to these nine frames.

The proper return of the pin carriage upon depression of the return selector pushbutton 29 is made possible by the previous extension of the memory pin when the original incorrect answer was selected. With reference to FIGS. 7 and 8, this memory pin is the one shown at 24a in axial alignment with the actuating arm 87 of a limit switch 88 having a normally open contact 88a. Extension of this pin 24a as caused by the memory selector arm 57 closes this contact 88a but as soon as forward rotary motion of the pin carriage is begun, the switch opens since the pin 24a rotates with the pin carriage and out of axial alignment with its contact arm. At the completion of the forward rotary motion of the pin carriage, the extended memory pin 24a is not reset by the actuation of the pin resetting plate 14 since it is outside the periphery of this plate. Thus, this memory pin is available for effecting a return selection which is made by depressing the return selector pushbutton 29.

Depression of the return selector pushbutton initially causes actuation of two limit switches 89 and 91 by engagement with their actuating arms 90 and 92 respectively. As shown in FIG. 6, the arms 90 and 92 of the switches 89 and 91 are disposed in the path of movement of the washer 38 connected to the shaft of the return selector pushbutton 29. The limit switches 89 and 91 and their associated actuating arms are so positioned in the line of movement of the washer 38 so that the switch 89 is actuated prior to the actuation of the switch 91.

As shown in FIG. 9, switch 89 has a normally closed contact 89a and a normally open contact 89b while switch 91 has a normally open contact 91a. Switches 89 and 91 are connected into the circuitry in a manner similar to the connection of the switches 69, 70 associated with the forward selector pushbuttons 27. Actuation of switches 89, 91, however, effects a reverse rotation of the pin carriage rather than a forward rotation thereof due to the presence of contact 89b which when closed will energize the coil of a return relay 92 to actuate its normally open and normally closed contacts 92/1–92/4.

Reverse rotation of the pin carriage will continue until the extended memory pin 24a rotates back into axial alignment with the arm 87 of limit switch 88 to close its normally open contact 88a and supply power to the coil of the stop relay 83. This, in turn, effects a stopping of the pin carriage in the same manner as described above with reference to stopping of a forward movement of the carriage. Since stopping of the reverse movement of the pin carriage is effected with the memory pin 24a located in its original position, the film will have been rotated back to the original reference frame just previously shown at the viewing station.

The memory pin which is set upon the depression of any of the forward selector pushbuttons 27 will eventually be cleared and returned to its original unextended position only after a full carriage revolution is effected to bring this extended memory pin into engagement with the cam surface 66 of the cam 64. Only the last forward carriage motion need be duplicated in a reverse manner any time a return selection is made. Therefore, the extension of a memory pin from a previous selection even if not cleared immediately will have no effect on the reverse movement of the carriage since the last extended memory pin, corresponding to the last forward selection that was made, will always be the first to reach the contact arm 87 of the limit switch 88 to stop the return movement of the carriage.

If the student upon making an incorrect answer to a question on the reference frame is instructed to depress the reverse selector pushbutton 28 because his answer indicates that he should return to a more elementary portion of the course rather than simply to the previous question, such a selection will cause a reverse rotation of the carriage through a predetermined number of frames. This reverse movement is, in turn, set up by the engagement of the raised projection 52 of the plastic bar 49 of the reverse selector pushbutton with the index pin axially aligned therewith. As shown by the dotted lines in FIG. 8, actuating surface 52 is axially aligned with the index pin located in contact with the arm 82 of switch 80. This pin is the same one just previously extended by the depression of an incorrect forward selector pushbutton 27 and has been rotated to the position actuating switch 80 and then cleared by movement of the pin resetting plate 14. Depression of the reverse selector pushbutton, however, will again extend this pin and this time move it an additional amount beyond its normally extended position until its forward end is disposed in the plane c—c (FIG. 2).

Depression of the selector pushbutton 28 will also actuate a pair of limit switches 93, 94 having actuating arms 95, 96 disposed in the path of axial movement of the switch actuating arm 50 which is a portion of plastic bar 49 actuated by pushbutton 28. As shown in FIG. 9, limit switch 93 includes a normally closed contact 93a and a normally open contact 93b while switch 94 has a normally open contact 94a. The sequence of operation of these limit switches 93, 94 is the same as that of the switches 69, 70 and 89, 91 in that depression of the selector pushbutton 28 will first actuate switch 93 and then switch 94 while release of this selector pushbutton 28 first returns switch 94 to its normal position and then switch 93.

Actuation of switches 93, 94 sets up power to the system effecting a reverse rotation of the pin carriage. Such rotation will continue until the abnormally extended index pin has rotated around and into axial alignment with the actuating arm 97 of a limit switch 98. As shown in FIG. 2, the end of the actuating arm 97 of the limit switch 98 against which the index pin is to engage is disposed in the plane c—c. Thus, this switch will only be actuated by movement of an index pin which has been extended beyond the normal plane of extension b—b and into plane c—c. As shown in FIG. 9, limit switch 98 has a normally closed contact 98a and a normally open contact 98b. Opening and closing of these contacts upon engagement of the index pin with the actuating arm 97 sets up power to stop relay 83 to stop rotation of the pin carriage in a manner similar to the stopping action described above, with reference to the forward and return movement of the pin carriage.

After the pin carriage has rotated in a reverse direction to bring the index pin into engagement with the arm 97 of the limit switch 98 to cause stopping of the carriage rotation, the pin resetting plate 14 will be actuated in the same manner as it is after every cycle of operation. As shown in FIG. 8, however, the pin resetting plate 14 is provided with the cutout 63 which is axially aligned with the actuating arm 97 and with the index pin disposed in engagement with this arm. Therefore, actuation of the pin resetting plate will not cause a resetting of the pin engaging the arm 97. This pin though actually not a memory pin serves as such for returning the carriage to the frame which was shown immediately before the depression of the reverse selector pushbutton. Such a return requires an actual forward index of the pin carriage to the point where this extended pin engages the contact portion 82 of the arm of limit switch 80. This being the position of this pin when the reverse selector pushbutton was first depressed, it will also represent the position of the carriage corresponding to the frame just previously shown at the viewing station.

As shown in FIG. 9, the logic circuitry is further provided with a relay 99 operable in association with depression of the reverse selector pushbutton 28. This relay includes a number of normally open and normally closed contacts 99/1–99/3; and energization of the coil of this relay upon contact of the extended index pin with the contact arm of limit switch 98 at the completion of a reverse movement of the carriage will set up the circuit to permit another reverse movement of the pin carriage upon a further actuation of the reverse selector pushbutton 28.

After an initial reverse cycle has been effected as described above, the pin over the contact 97 of the switch 98 is not reset. Therefore, a second depression of the reverse selector pushbutton would normally cause an immediate stop action through the energization of relay 83. To prevent this so as to permit a reverse-after-reverse selection, relay 99 is such that it will not operate until the carriage has caused the previous reverse pin to release switch 98. The normally open contact 99/3 of relay 99 then closes and will permit subsequent operation of contact 98b of switch 98 to energize the stop relay 83. This is in contrast to any attempted return-after-return selection. After one return selection has been made, a memory pin rests on contact 87 of switch 88. A second return selection will close relays 76/4 and 92/3; but since contact 88a of the limit switch 88 is already closed, the stop relay 83 will operate immediately thus preventing cycle motion for the attempted second return. As more fully described below, there is one situation where a second return is allowed and that is when the frame to which the film has been returned specifically instructs the student to depress the return selector pushbutton.

The direction of rotation of the pin carriage by the drive motors is controlled by energization of the relays as described above operating in conjunction with the forward relay 100 having the normally open and normally closed contacts 100/1–100/4. Actuation of this relay upon the depression of a pushbutton requiring a forward index movement of the pin carriage causes normal orientation of the contacts 100/1–100/4 to reverse so as to permit such forward operation.

In order to control the movement of the carriage and prevent such movement when the student depresses a pushbutton contrary to the instructions shown on the frame located at the viewing station, a sensing system is provided. The sensors of the system include the two photoconductive cells 101 and 102 which are constructed to sense code contained on the frame of the film located at the viewing station. According to this code as sensed by the photoconductive cells 101 and 102, either one or both of two relays, 103, 104 will be energized. As shown in FIG. 9, relay 103 contains normally open and normally closed contacts 103/1–103/4 while relay 104 includes the normally open and normally closed contacts 104/1–104/4. These two relays 103, 104 are so connected into the circuitry of the system whereby when either one or both of them are energized, only certain operations may be performed. Energization of this part of the circuit is effected after the initial depression of one of the pushbuttons and before the pushbutton reaches its fully retracted position upon release thereof by the students.

In operation, energization of the relay 103, upon a particular code being sensed, will throw the relay switches 103/1–103/4 from their normal position and prohibit any movement of the pin carriage upon depression of any one of the forward selector pushbuttons 27. This is so since depression of such a pushbutton will close the normally open contact 69b and direct current to the coil of the stop relay 83 through contact 103/2 which is now closed. Also, energization of the relay 103 will prohibit movement of the carriage upon depression of the reverse selector pushbutton 28 since the normally open contact 103/3 which is in series with the normally closed contact 104/4 will be closed and similarly direct current to the stop relay 83 when pushbutton 28 is depressed to close the normally open contact 93b of switch 93. Thus, when relay 103 is energized by the photoconductive cell 101 sensing an appropriate code on the film, only depression of the return selector pushbutton will cause movement of the pin carriage. This, of course, will correspond to the instructions given to the student on the frame then being viewed.

If the student is to be prohibited from effecting a return movement of the pin carriage as would otherwise be caused by actuation of the return selector pushbutton 29, an appropriate code on the frame of the film then presented at the viewing station will be sensed by the sensing cell 102 to energize relay 104. Energization of this relay will in turn cause the normally open contact 104/3 to close; and since depression of the return selector pushbutton 29 actuates switches 89 and 91 to energize the coils of the relays 76 and 92, and close the normally open contacts 76/4 and 92/3, the circuit to the stop relay 83 will be closed. Energization of the relay 104 will also close the normally open contact 104/4 which is connected in series with the normally closed contact 103/3 of relay 103 to similarly close the circuitry to the stop relay 83 and prevent movement of the carriage upon actuation of the reverse selector pushbutton 28. Thus, energization of the relay 104 will set the logic circuitry so as to permit only a forward rotation of the pin carriage upon the depression of any one of the forward selector pushbuttons 27.

Finally, if the student is to be permitted to make only a reverse movement of the pin carriage in response to depression of the reverse selector pushbutton 28, the code of the film will be such as to energize both of the relays 103 and 104. As described above, this will prevent movement of the carriage upon actuation of either of the forward pushbutton 27 or the return pushbutton 29. However, energization of both of the relays 103 and 104 at the same time will not complete the circuit between the stop relay 83 and the switch 93b associated with the reverse selector pushbutton 28 and thus this pushbutton will remain operable to effect the desired reverse movement of the pin carriage.

The above description of the invention has been made with reference to the presently preferred embodiment; however, it is to be understood that various changes may be made thereto without departing from the scope of the invention as set forth in the following claims.

We claim:

1. In a teaching machine having a film with text recorded on a plurality of frames thereof and a film transport mechanism for moving said film to successively position selected frames thereof at a viewing station, an improved selector mechanism connected through an electrical circuit to said film transport mechanism for selecting the frame of the film to be viewed at said viewing station comprising a frame work, a movable pin carriage mounted on said framework and having a series of movable control pins, said series of control pins including an array of index pins and another array of memory pins, drive means connecting the film transport mechanism to said carriage for correlated movement with respect thereto, a plurality of depressible selector pushbuttons aligned with said array of index pins for selectively producing movement of an aligned index pin to a normal extended position upon depression of a selected pushbutton, said plurality of selector pushbuttons including a plurality of memory selector arms connected thereto for axial movement therewith, said memory selector arms being aligned for actuation of said memory pins, whereby depression of any one of said selector pushbuttons moves the aligned index pin to a normal extended position and depresses the associated memory selector arm aligned therewith to a normal extended position, one switch means connected into said electrical circuit and operable upon depression of a selected pushbutton to electrically initiate movement of said carriage and film transport mechanism in a predetermined direction from a reference position where a reference frame of the film is located at said viewing station, said one switch means also including means for selectively initiating return movement of said pin carriage and film transport mechanism, and other switch means connected into said electrical circuit and operable upon selected engagement with any one of said extended index and memory pins to stop movement of said carriage.

2. A selector mechanism as defined in claim 1 wherein said pin cariage comprises a rotary carriage; said series of movable control pins include one circular array of index pins and another circular array of memory pins mounted thereon far movement longitudinally of the axis of rotation of said carriage; said drive means is connected between said carriage and film transport mechanism whereby rotary movement of said carriage through a selected increment drives the film transport mechanism to move the film through a related number of frames and position a selected frame at said viewing station; said selector pushbuttons include a plurality of forward selector pushbuttons axially aligned with the one array of index pins and having a memory selector arm connected thereto for axial movement therewith, said memory selector arm being disposed in axial alignment with the other array of memory pins at a fixed location therearound whereby depression of any one of said forward selector pushbuttons moves the axially aligned index pin to a normal extended position and depresses said memory selector arm to move the memory pin aligned therewith to a normal extended position and said selector pushbuttons further include a return selector pushbutton; said one switch means includes a first switch means operated by axial movement of any one of said forward selector pushbuttons upon axial extension of a selected index pin and associated memory pin to electrically initiate movement of said carriage and film transport mechanism in a forward film advancing direction from a reference position where a reference frame of the film is located at said viewing station, and second switch means operated by axial movement of said return selector pushbutton for electrically initiating return movement of said pin carriage and film transport mechanism and said other switch means includes third switch means positioned in the path of rotary movement of the extended index pin and operable upon engagement thereby after forward rotary movement of said carriage through a selected increment as determined by the angular distance between the original position of the extended index pin and third switch means to electrically stop the forward movement of said film transport mechanism with the corresponding selected frame of the film at said viewing station and fourth electrical switch means positioned on axial alignment with the other pin array at said fixed location and in the path of movement of said memory pins when in a normal extended position, said fourth switch means operable upon engagement of the previously extended memory pin during return movement of said film transport mechanism to electrically stop said return movement with the reference frame of said film at said viewing station.

3. A selector mechanism as defined in claim 2 further including selector pushbutton return means for moving said pushbuttons to their original position after depression thereof.

4. A selector mechanism as defined in claim 3 wherein said first and second switch means are connected into said electrical circuit to initiate movement of said film transport mechanism upon release of a selected pushbutton from its depressed position.

5. A selector mechanism as defined in claim 2 wherein a selector pushbutton lockout mechanism is provided for preventing depression of any of said selector pushbuttons while said film transport mechanism is moving.

6. A selector mechanism as defined in claim 5 wherein said lockout mechanism comprises a lockout plate member mounted for movement between a first position in the path of said axial movement of each of said selector pushbuttons preventing engagement thereof with the axially aligned pins on said carriage and a second position laterally offset from the path of axial movement of said selector pushbuttons; mechanical lockout control means normally urging said lockout plate into said first position; electrically operated lockout control means normally holding said lockout plate in said second position against the force of said mechanical means; means for de-energizing said electrically operated lockout control means upon depression of any one of said selector pushbuttons whereby said mechanical lockout control means will move said lockout plate to said first position upon release of said pushbutton from its depressed position; and means operable upon actuation of either of said third or fourth switch means to reenergize said electrically operated lockout control means to move said lockout plate to said second position.

7. A selector mechanism as defined in claim 6 wherein said lockout plate member is mounted for rotary movement about the axis of said carriage between said first and second positions and includes a plurality of openings larger in size than the cross-sectional dimension of the forward selector pushbuttons and in axial alignment therewith when said lockout plate member is in said second position.

8. A selector mechanism as defined in claim 5 wherein a switch actuating plate member is mounted on said forward selector pushbuttons for axial movement therealong upon depression and release of any one of said forward selector pushbuttons, said plate being axially aligned with said first switch means to cause movement thereof from a first contact position to a second contact position upon depression of any one of said forward selector pushbuttons and back to said first contact position upon release of said forward selector pushbutton, said first switch means being operable when in said second contact position to actuate said means for deenergizing the electrically operated lockout control means and operable when returned to said first contact position upon release of said forward selector pushbutton to initiate movement of said film transport mechanism in said forward film advancing direction.

9. A selector mechanism as defined in claim 2 which includes means operable after stopping of the forward movement of said film transport mechanism for resetting the previously extended index pin to its original unextended position.

10. A selector mechanism as defined in claim 9 wherein said means for resetting the previously extended index pin includes an axially movable pin resetting plate axially aligned with said index pins on the axial side thereof opposite said selector pushbuttons.

11. A selector mechanism as defined in claim 2 wherein each of said forward selector pushbuttons are positioned between said memory selector arm and said third switch means as measured along the forward path of rotary movement of said carriage whereby the memory pin extended upon extension of a selected index pin trails said extended index pin in its forward rotary movement toward said third switch means.

12. A selector mechanism as defined in claim 11 further including means operable upon engagement with the previously extended memory pin for resetting said memory pin, said means being positioned in the path of rotary movement of said extended memory pin at a location relative to said third switch means whereby engagement with said extended memory pin occurs after the associated extended index pin has moved in a forward rotary direction past said third switch means.

13. A selector mechanism as defined in claim 2 which includes an axially depressible reverse selector pushbutton mounted on said framework and having an actuating portion in axial alignment with said third switch means for moving the index pin aligned with said third switch means into an extra extended position beyond said normal extended position; fifth switch means connected into said electrical circuit and operated by axial movement of said reverse selector pushbutton for electrically initiating reverse movement of said film transport mechanism; and sixth switch means connected into said electrical circuit and positioned in the path of rotary movement of the extra extended index pin and operable upon engagement thereby during reverse movement of said film transport mechanism to electrically stop said reverse movement, said sixth switch means being located axially beyond the normal extended position of said index pins and at a predetermined distance rearwardly of said forward selector pushbuttons and said third switch means as measured along the path of forward rotary movement of said index pins to stop said reverse movement after a predetermined number of frames corresponding to the angular distance from said third switch means to said sixth switch means have moved to said viewing station.

14. A selector mechanism as defined in claim 13 wherein said pin resetting plate is provided with an opening axially aligned with said sixth switch means and the index pin in engagement therewith.

15. A selector mechanism as defined in claim 2 which includes code sensing means connected into said electrical circuit for sensing code contained on the frame of said film disposed at said viewing station to control movement of said pin carriage in accordance with the code being sensed.

16. A selector mechanism as defined in claim 14 further including code sensing means connected into said electrical circuit for sensing code contained on the frame of said film disposed at said viewing station to selectively prevent movement of said pin carriage upon depression of any one of said forward, return and reverse selector pushbuttons in accordance with the code being presented.

References Cited
UNITED STATES PATENTS 3,274,703  9/1966  Pavey et al. ------------ 35—9

WILLIAM H. GRIEB, Primary Examiner